Feb. 16, 1926.  
T. L. LYNCH ET AL  
1,573,409  
TUBING TONGS AND WRENCH  
Filed Oct. 24, 1921
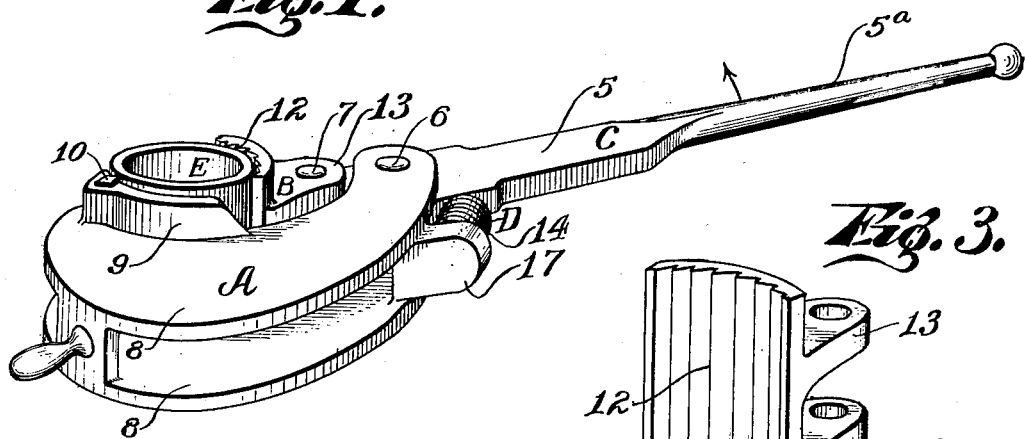
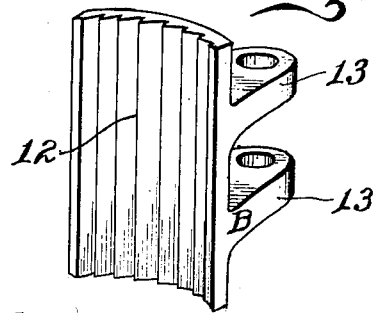
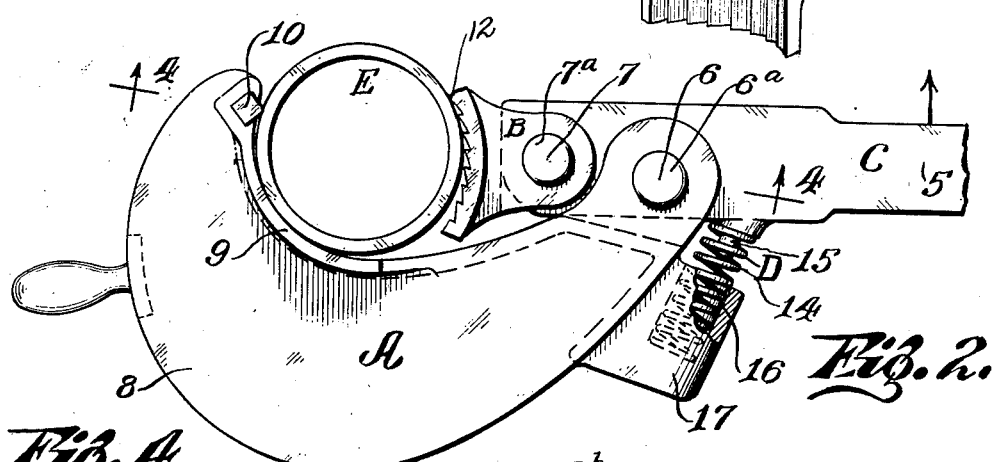
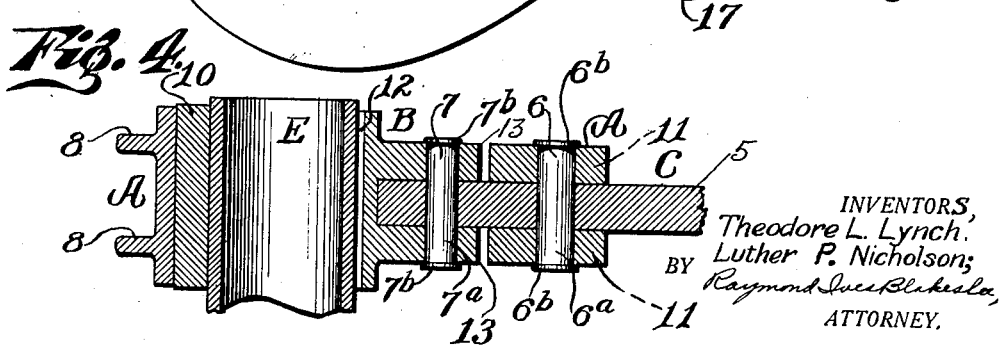

Patented Feb. 16, 1926.

1,573,409

UNITED STATES PATENT OFFICE.

THEODORE L. LYNCH AND LUTHER P. NICHOLSON, OF OXNARD, CALIFORNIA.

TUBING TONGS AND WRENCH.

Application filed October 24, 1921. Serial No. 509,964.

*To all whom it may concern:*

Be it known that we, THEODORE L. LYNCH and LUTHER P. NICHOLSON, citizens of the United States, residing at Oxnard, in the county of Ventura and State of California, have jointly invented new and useful Improvements in Tubing Tongs and Wrenches, of which the following is a specification.

This invention relates to pipe and tubing tongs and wrenches, and more particularly to a device for screwing and unscrewing and disconnecting lengths of line pipe as well as tubing for deep well pumps, and has for its object to provide an improved tool, implement or device of the general character stated, which will be superior in point of relative simplicity and inexpensiveness of construction, taken in conjunction with positiveness and effectiveness in operation, convenience in handling, manipulation and application to and removal from the work, freedom from liability to get out of repair, and compactness in form, and which will be generally superior in efficiency and serviceability.

With the above and other objects in view, the invention consists in the novel and useful provision, formation, association, combination, relative arrangement and interrelation of parts, members and features, all as hereinafter described, shown in the drawing, and finally pointed out in claims.

In the drawing:

Figure 1 is a perspective view of an improved tongs or wrench constructed and organized to embody the invention and shown applied to a piece of tubing or other work to be operated upon;

Figure 2 is an enlarged top plan view of the wrench or tool or tongs and work, shown in Figure 1, part of the handle being broken away;

Figure 3 is an enlarged perspective view of a jaw member shown in the other figures, the same being in detached position; and, Figure 4 is a detail sectional view taken upon the line $x^4-x^4$, Figure 2, and looking in the direction of the appended arrows.

Corresponding parts in all the figures are designated by the same reference characters.

Referring with particularity to the drawing, the improved wrench, tongs or implement therein shown comprises in the main two jaw members A and B, respectively, a handle member C, and means D tending to hold the jaw member A in work-engaging position, so that the work E will be engaged and embraced between the jaws A and B to be turned or operated thereby upon the operation of the device which is caused by moving the handle member C in the direction of the large arrow in Figures 1 and 2. The handle member C is shown as a straight bar or arm 5, having a grip or handle portion $5^a$, at its outer end, and carrying the jaws A and B pivotally at its inner end, as at 6 and 7 respectively, said jaw A being of bowed formation, and of heavy stress-resisting construction, being preferably ribbed as at 8 upon its outer arcuate periphery to add strength to such jaw, the inner arcuate portion of said jaw A being flanged beyond one or both faces, as at 9, such flanges and the inner arcuate peripheral portion of the jaw fitting against the work and being provided with a gripping inset 10 of tool steel or material harder than the jaw A to impinge upon and bite the work in the action of the tool. This jaw A has its pivotal connection at 6 with the annular member C through the agency of a pin $6^a$ passed through spaced furcations 11 at the inner extremity of the jaw A and embracing such handle member C, such pin likewise passing through the handle member C and being upset or headed over at its ends, as at $6^b$, or otherwise held in position. The jaw B is provided with an arcuate work-engaging and serrated face, preferably having a case-hardened outer surface portion 12 which is presented to the work in opposition to the impinging inset 10, and likewise has furcations 13 at its inner portion which embrace the handle member C and through which a pivot pin $7^a$ is passed, this pin being likewise passed through the handle member C and headed over at $7^b$ at its ends, or otherwise secured in position. This pivotal mounting of the jaw B at 7 is at a point between the work and the pivotal point of mounting 6, of the jaw A.

The means D preferably comprises a coil compression spring 14 one end of which is shown as applied over a centering pin 15 projecting from the handle member C, and the other end of which is shown as received within a suitable chamber 16 provided within a head or off-set 17 upon the jaw A adjacent to its pivotal point 6.

In operation, the jaws A and B are presented to the work, a swinging movement thereof through the agency of the handle member 5 causing the jaws to execute a movement of relative operation, the spring 14 yielding in its action. The jaws thus pass to the work and receive it between themselves, whereupon the spring 14 becomes effective to bring the jaws into gripping contact with the work. The handle member is then moved in the direction of the large arrows in Figures 1 and 2, the inset 10 and the serrations at 12 bite upon the work, and due to the relative arrangement of the jaws and their pivotal connection with the handle member, a continued movement of the handle member in the direction indicated causes an increased grip of the jaws upon the work, resulting ultimately in a turning movement which, if the jaws be applied to one of two joined or threadedly connected lengths of pipe, promotes either connection or disconnection of the joined pipe lengths, depending upon the direction of rotation of the work. After a given stroke of the handle member has been executed, a return stroke thereof is produced, and the spring 14 yields, permitting the jaws to loosen their grip on the work, but still holding them in position for a further operative stroke of the handle member. As soon as this stroke ensues, the jaws again bite upon the work as in the first instance, and a second operative action takes place. These alternate working and return strokes may be maintained until the unscrewing of the connected pipe members or other desired result has been accomplished. In this type of tool or wrench or tongs, it is unnecessary to employ any chain or other device to hold the jaws to the work, and once having been applied to the work they are always in position to immediately commence their action upon the work upon the initiation of a working stroke of the handle member. The tool is easily applied to the work, in the manner above described, and effectively operates upon it, and the jaws may readily be replaced if worn or broken or damaged through any excessive or undue strain or accident, the pivot pins 6ª and 7ª being merely driven out and fresh pins supplied upon the re-assembling of the parts.

Of course the serrated face 12 of the jaw B may be separate from the rest of the jaw, so that a fresh serrated surface portion may be supplied after wear, although we have not shown this in the accompanying drawing, such substitution of detachable plates being well-known in the arts. The inset 10 likewise may be removed for substitution or sharpening. It will be noted that the line of impingement of the inset 10 of the jaw A lies normally in approximately the same plane as the pivotal points 6 and 7 of the jaws A and B. This ensures or tends to ensure an immediately effective gripping action during a working stroke of the tool, and a corresponding immediately effective release of the work by the jaws during a return movement of the handle member. The pivotal mounting of the jaws A and B causes them to always properly engage the work under all conditions of operation, and this more particularly ensues from the pivotal mounting of the jaw B in conjunction with the pivotal mounting of the jaw A. By such pivotal mountings the jaws are always properly presented to the work during a working stroke of the handle member, and under all variations of strain imposed upon the handle member, and in compensation for all relative play as between the jaws as entireties and the work.

It is obvious that many variations and changes may be made in practicing the invention in departure from the specific showing and disclosure of the drawing and preceding description, all without departing from the true spirit of the invention.

Having thus disclosed our invention, we claim and desire to secure by Letters Patent:

1. A device of the character disclosed, comprising a handle member, a jaw pivotally connected with the handle member at the inner end thereof, a second jaw pivotally connected with the handle member at a point on the handle member outward of the point of pivotal connection of said first named jaw, the second named jaw having an impingement zone at which it engages the work, such impingement zone lying in part approximately in a line common to the points of pivotal mounting of both of said jaws; there being a work-engaging projection at said part of said impinging zone and yielding means for moving one of said jaws into engagement with the work.

2. A device of the character disclosed, comprising a handle member, a jaw pivotally connected with the handle member at the inner end thereof, a second jaw pivotally connected with the handle member at a point on the handle member outward of the point of pivotal connection of said first named jaw, the second named jaw having an impingement zone at which it engages the work, such impingement zone lying in part approximately in a line common to the points of pivotal mounting of both of said jaws; there being a work-engaging projection at said part of said impinging zone; the first named jaw having a roughened surface adapted to engage the work at a portion thereof diametrically opposed to said work-engaging projection; a compression spring being interposed between the handle member and one of said jaws to hold the jaw in position to operatively engage the work.

3. A device of the character disclosed, comprising a handle member, a jaw pivotally connected with the handle member at the inner end thereof, a second jaw pivotally connected with the handle member at a point on the handle member outward of the point of pivotal connection of said first named jaw, the second named jaw having an impingement zone at which it engages the work, such impingement zone lying in part approximately in a line common to the points of pivotal mounting of both of said jaws; there being a detachable inset at said part of said impinging zone; the first named jaw having a roughened surface adapted to engage the work at a portion thereof diametrically opposed to said inset and means for urging the jaws to operatively engage the work.

4. A tubing tongs, comprising a handle member, a jaw member pivoted thereto, said jaw being provided with a curved work-engaging portion, there being a flange at such curved work-engaging portion, and an inset in part carried by such flange, a second jaw member pivoted to the handle member and between which and the inset work is adapted to be gripped; said first named jaw being provided with a socketed member, and a coil spring in part received within such socketed member and adapted to bear against a portion of the handle member.

In testimony whereof, we have signed our names to this specification.

THEODORE L. LYNCH.
LUTHER P. NICHOLSON.